(12) United States Patent
Greb et al.

(10) Patent No.: US 8,318,262 B2
(45) Date of Patent: Nov. 27, 2012

(54) USE OF SPHERICAL METAL PARTICLES AS LASER-MARKING OR LASER-WELDABILITY AGENTS, AND LASER-MARKABLE AND/OR LASER-WELDABLE PLASTIC

(75) Inventors: Marco Greb, Nürnberg (DE); Martin Schaal, Hohenstadt (DE); Thomas Schuster, Lauf (DE); Walter Ziegler, Velden (DE)

(73) Assignee: Eckart GmbH (DE)

( * ) Notice: Subject to any disclaimer, the term of this patent is extended or adjusted under 35 U.S.C. 154(b) by 149 days.

(21) Appl. No.: 12/520,686

(22) PCT Filed: Aug. 18, 2007

(86) PCT No.: PCT/EP2007/007321
§ 371 (c)(1),
(2), (4) Date: Sep. 3, 2009

(87) PCT Pub. No.: WO2008/083726
PCT Pub. Date: Jul. 17, 2008

(65) Prior Publication Data
US 2010/0009171 A1    Jan. 14, 2010

(30) Foreign Application Priority Data
Dec. 22, 2006   (DE) .......................... 10 2006 062 269

(51) Int. Cl.
*C08F 2/46*   (2006.01)
*C08F 2/48*   (2006.01)

(52) U.S. Cl. .................. 427/508; 106/31.01; 106/31.06; 106/604; 428/195.1; 428/328; 524/439; 524/440; 524/441; 523/457; 523/205; 523/209

(58) Field of Classification Search .................. 524/413, 524/439, 440, 441; 428/195, 195.1, 328; 523/205, 209, 457; 106/31.01, 31.06, 604; 427/508
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,055,859 A | 9/1962 | Vollmert |
| 3,393,210 A | 7/1968 | Speck |
| 3,530,094 A | 9/1970 | Schnell et al. |
| 3,535,280 A | 10/1970 | Schnell et al. |
| 4,224,419 A | 9/1980 | Swoboda et al. |
| 4,537,949 A | 8/1985 | Schmidt et al. |
| 4,540,772 A | 9/1985 | Pipper et al. |
| 4,634,734 A | 1/1987 | Hambrecht et al. |
| 4,957,965 A | 9/1990 | Taubitz et al. |
| 4,970,255 A | 11/1990 | Reimann et al. |
| 5,206,280 A * | 4/1993 | Williams ...................... 524/409 |
| 5,760,120 A | 6/1998 | Itoh et al. |
| 5,928,842 A | 7/1999 | Shinmoto et al. |
| 6,238,847 B1 | 5/2001 | Axtell et al. |
| 6,323,279 B1 | 11/2001 | Guntherberg et al. |
| 6,693,657 B2 | 2/2004 | Jones et al. |
| 6,727,308 B2 | 4/2004 | Kniess et al. |
| 6,866,710 B2 | 3/2005 | Heider et al. |
| 2001/0030179 A1* | 10/2001 | Knieb et al. ............. 219/121.69 |
| 2002/0039667 A1 | 4/2002 | Takaya et al. |
| 2004/0180010 A1 | 9/2004 | Andes et al. |
| 2005/0161641 A1* | 7/2005 | Gros .............................. 252/500 |
| 2006/0148968 A1 | 7/2006 | Van Duijnhoven et al. |
| 2006/0155007 A1 | 7/2006 | Huber et al. |
| 2006/0216441 A1 | 9/2006 | Schubel et al. |
| 2007/0080146 A1 | 4/2007 | Stockum et al. |
| 2007/0154642 A1 | 7/2007 | Klein et al. |
| 2007/0173581 A1 | 7/2007 | Hager et al. |
| 2007/0199478 A1 | 8/2007 | Schlegl et al. |
| 2008/0081275 A1* | 4/2008 | Ueda et al. .................. 430/110.2 |
| 2008/0290649 A1 | 11/2008 | Klein et al. |
| 2010/0203300 A1* | 8/2010 | Coulter et al. ............. 428/195.1 |

FOREIGN PATENT DOCUMENTS

CA    2294235    12/1998

(Continued)

OTHER PUBLICATIONS

International Search Report dated Nov. 22, 2007, issued in corresponding international application No. PCT/EP2007/007321.
German Office Action dated Jan. 8, 2008, issued in corresponding preiority German application No. 10 2006 062 269.3-43.
Japanese Office Action dated Feb. 28, 2012 in corresponding Japanese Patent Application No. 2009-541784 (with English translation).

*Primary Examiner* — James J Seidleck
*Assistant Examiner* — Deve E Valdez
(74) *Attorney, Agent, or Firm* — Ostrolenk Faber LLP

(57) ABSTRACT

The invention relates to the use of spherical metal particles, which are free of antimony and/or antimony-containing compounds, as a laser marking agent or laser weldability agent in a plastic, wherein the particle size distribution of the spherical metal particles, as determined by means of laser granulometry, in the form of the volume-averaged cumulative undersize particle size distribution, has a $D_{99}$ value of $<110$ μm, a $D_{90}$ value of $<75$ μm, and a $D_{50}<45$ μm.

The invention further relates to a laser-markable and/or laser-weldable plastic which a laser marking agent consisting of spherical metal particles, which are free of antimony and/or antimony-containing compounds, wherein the particle size distribution of the spherical metal particles, as determined by means of laser granulometry, in the form of the volume-averaged cumulative undersize particle size distribution, has a $D_{99}$ value of $<110$ μm, a $D_{90}$ value of $<75$ μm, and a $D_{50}<45$ μm.

24 Claims, No Drawings

FOREIGN PATENT DOCUMENTS

| | | |
|---|---|---|
| DE | 1 495 730 | 4/1969 |
| DE | 1 300 266 | 4/1970 |
| DE | 196 32 675 | 2/1998 |
| DE | 197 26 136 A1 | 12/1998 |
| DE | 197 28 629 | 1/1999 |
| DE | 198 10 952 A1 | 9/1999 |
| DE | 102 28 186 A1 | 1/2004 |
| DE | 102 59 246 A1 | 7/2004 |
| DE | 103 15 775 A1 | 10/2004 |
| DE | 10 2004 053 376 A1 | 6/2005 |
| DE | 10 2004 045 305 A1 | 3/2006 |
| DE | 10 2005 011 180 A1 | 9/2006 |
| EP | 38 094 | 10/1981 |
| EP | 99 532 | 2/1984 |
| EP | 39 524 | 6/1984 |
| EP | 129 195 | 12/1984 |
| EP | 129 196 | 12/1984 |
| EP | 135 130 | 3/1985 |
| EP | 38 582 | 8/1985 |
| EP | 299 444 | 1/1989 |
| EP | 302 485 | 2/1989 |
| EP | 113 112 | 6/1993 |
| EP | 1 145 864 A1 | 10/2001 |
| JP | 8-120133 | 5/1996 |
| JP | 2002-522618 | 7/2002 |
| JP | 2004-027238 | 1/2004 |
| JP | 2005-112934 | 4/2005 |
| JP | 2006-509099 | 3/2006 |
| JP | 2007-246723 | 9/2007 |
| JP | 2007-526149 | 9/2007 |
| JP | 2008-010978 | 1/2008 |
| WO | WO 02/055287 A1 | 7/2002 |
| WO | WO 2005/047009 | 5/2005 |
| WO | WO 2005/077829 * | 8/2005 |
| WO | WO 2005/084956 | 9/2005 |
| WO | WO 2005/097514 A | 10/2005 |
| WO | WO 2006/029677 | 3/2006 |
| WO | WO 2007/062785 A | 6/2007 |

* cited by examiner

USE OF SPHERICAL METAL PARTICLES AS LASER-MARKING OR LASER-WELDABILITY AGENTS, AND LASER-MARKABLE AND/OR LASER-WELDABLE PLASTIC

CROSS REFERENCE TO RELATED APPLICATIONS

The present application is a 35 U.S.C. §371 National Phase conversion of PCT/EP2007/007321, filed Aug. 18, 2007, which claims benefit of German Application Ser. No. 10 2006 062 269.3-43, filed Dec. 22, 2006, the disclosure of which is incorporated herein by reference. The PCT International Application was published in the German language.

TECHNICAL FIELD

The invention relates to the use of spherical metal particles as an additive for laser marking and/or laser welding of plastics. The invention further relates to a laser-markable and/or laser-weldable plastic which comprises a laser marking agent according to the present invention.

BACKGROUND OF THE INVENTION

The marking of plastics by laser and the welding of plastics parts by means of laser energy are known per se. Both are brought about as a result of absorption of the laser energy in the plastics material, either directly, by interaction with the polymer, or indirectly, with a laser-sensitive agent added to the plastics material. The laser-sensitive agent may be an organic dye or a pigment which, by absorbing the laser energy, produces a visible local change in color in the plastic. It may also be a compound which, when irradiated with laser light, is converted from an invisible, colorless form into a visible form. In the case of laser welding, the heating of the plastics materials as a result of absorption of the laser energy in the joining region is so great that the material melts and the two parts weld to one another.

The marking of production goods is becoming increasingly important in virtually all branches of industry as part of the general rationalization measures. Thus, for instance, there is a need to apply production data, batch numbers, expiration dates, product IDs, bar codes, corporate logos, etc. Set against conventional marking techniques such as printing, embossing, stamping, and labeling, laser marking is significantly quicker, on account of its contactless operation, and is more precise and is also unproblematic to apply to nonplanar surfaces. Since the laser markings are generated beneath the surface in the material, they are durable, robust and substantially more secure with respect to removal, alteration or even counterfeiting. Contact with other media, such as in the case of containers for liquids, and closures, is likewise uncritical for this reason—on the assumption, of course, that the plastics matrix is stable. Security and durability of production IDs, and also freedom from contamination, are extremely important in the case, for instance, of packaging of pharmaceuticals, comestibles, and beverages.

Laser marking technology has proven very suitable in particular in connection with the marking of plastics. To be able to carry out efficient marking of plastics it is necessary to generate sufficient interaction between the plastic to be marked and the laser light. Here, firstly, it must be borne in mind that the energy introduced into the plastics should not be too high, since it may destroy the plastics article or its texture. Secondly, the laser beam must not pass through the plastic without significant interaction, since in that case the plastic cannot be marked.

In order to increase the interaction of the laser beam with the plastic, plastics are used in which absorption agents, also referred to as absorbers, have been incorporated. These absorbers may be, for example, laser-markable polymers or else pearlescent pigments and metallic effect pigments.

In the case of pearlescent pigments and metallic effect pigments, the irradiation of laser light results in heating of these pigments. In the immediate environment of the pearlescent pigments and of the metallic effect pigments, there is then a thermal change in the plastic, e.g., a carbonization or a foaming of the plastic, thereby allowing marking or identification of the plastics article.

DE 197 26 136 A1 discloses the use of laser-markable polymers in the form of microground particles having a size of 0.1 to 100 μm. A disadvantage of these laser-markable polymers is that they can melt during the processing of the plastics doped with the laser-markable polymers. It is therefore necessary for the melting ranges of the incorporated laser-markable polymer and of the plastics system used to be harmonized with one another.

DE 198 10 952 A1 discloses the use of pearlescent pigments or metallic luster pigments as absorbers in plastics. A disadvantage of the use of pearlescent pigments or metallic luster pigments or metallic effect pigments is that, in order to achieve satisfactory contrast after laser marking, the level of concentration must either be so high that it automatically entails coloring of the plastic with pearlescence or a metallic coloring.

Accordingly, with use of pearlescent pigments and/or metallic effect pigments, it is not possible satisfactorily to achieve high-contrast laser marking without appreciable coloring in the case of pearlescent pigments (pearl luster effect) or without appreciable metallic coloration in the case of metallic luster or metallic effect pigments. In addition, metallic effect pigments and pearlescent pigments are relatively expensive.

Moreover, the plateletlike structure of the pearlescent pigments or of the metallic luster or metallic effect pigments has the deleterious effect that the pigments, owing to their platelet structure, undergo orientation in the laminar flow that is an inevitable corollary of the operation of injection molding of the plastics mass, and this leads to flow lines or streaks in the plastics article produced.

To obtain a desired contrast in the laser marking of plastics, EP 1 145 864 A1 teaches using a mixture of metal powder and/or semimetal powder and of an effect pigment or two or more effect pigments based on phyllosilicates. Here again there is visible coloration or metallic coloring of the plastic, which is unwanted for clear and transparent plastics. Moreover, the pearlescent pigments likewise deleteriously produce streaks or flow lines in the plastics articles produced.

DE 10 2004 053 376 A1 discloses colored laser markings and laser inscriptions on plastics that are based on the welding of a polymeric inscription medium to the plastics surface. The energy absorbers suitable for marking that are mentioned in this specification include spherical metal powders, among other absorbers. No details, however, are given concerning the size of the metal powders.

In accordance with the teaching of DE 10 2004 045 305 A1, the problem that exists in the prior art of the absorbers sustainedly coloring the plastics to be inscribed can be eliminated by incorporating a boride compound, preferably lanthanum hexaboride, into the plastics material. A disadvantage is that these boride compounds, especially lanthanum hexaboride constitute a significant cost factor. Consequently these boride compounds are not suitable as a laser marking agent for widespread use.

In order to allow marking of transparent plastics materials without coloration, use is made, in accordance with the teaching of U.S. Pat. No. 6,693,657 B2 and also of WO 2005/047009, of a laser marking agent which comprises a mixture of antimony oxide and tin oxide. WO 2005/084956 describes high-transparency plastics materials which are laser-markable and/or laser-weldable by means of nanoscale indium-tin oxide or antimony tin oxide particles. A disadvantage is that, like any other antimony compound, antimony oxide is highly toxic. Consequently this laser marking agent poses, on the one hand, a considerable risk to environment and people, both in production and processing and in disposal, since, firstly, antimony or compounds containing antimony must be used and, lastly, the plastics articles which contain antimony and/or compounds containing antimony must be disposed of again.

WO 2002/055287 A1 describes a process for producing laser-welded composite moldings. It mentions metal flakes and metal powders as fillers. These fillers, however, are used at relatively high concentrations of 1% to 60% by weight, based on the plastics molding.

SUMMARY OF THE INVENTION

It is an object of the present invention to provide a laser marking agent that allows marking of transparent plastics materials with effective contrast and with streak-free incorporation. An effective contrast is preferably to be obtained without having to color the plastics materials automatically.

It is a further object of the invention to provide a toxicologically unobjectionable laser marking agent which is available inexpensively and in large quantities.

A further object is to provide a laser-markable and/or laser-weldable plastic with a laser marking agent that exhibits virtually no hazing or coloration as a result of the laser marking agent.

The object on which the invention is based is achieved through the use of spherical metal particles, which are free of antimony and/or antimony-containing compounds, as a laser marking agent in a plastic, wherein the particle size distribution of the spherical metal particles, as determined by means of laser granulometry, in the form of the volume-averaged cumulative undersize particle size distribution, has a $D_{99}$ value of <110 µm, a $D_{90}$ value of <75 µm, and a $D_{50}$ value of <45 µm.

Preferred embodiments are specified in the dependent claims.

Laser granulometry is a laser diffraction method in which the size of the particles is determined from the diffraction of the laser light. It is preferred to carry out the laser diffraction method with the Helos instrument from Sympatec, Clausthal-Zellerfeld, Germany, in accordance with the manufacturer's instructions.

The object is further achieved by provision of a plastic which comprises, as a laser marking agent, spherical metal particles, which are free of antimony and/or antimony-containing compounds.

Preferred embodiments are specified in the dependent claims.

Metal powders are well established. Their uses include a starting material for the production of metal flakes. Thus, for example, zinc powder is used as a corrosion pigment.

It has emerged, completely surprisingly, that metal powders which are referred to as spherical metal particles in this application are outstandingly suitable as laser marking agents. It is surprising in this context that, when metal powders are used, no flow lines and/or streaks are produced or made visible in the plastic material.

Entirely surprising in this context is that spherical metal particles allow high-contrast marking without necessarily transparent plastics materials having to be made hazy or colored. The reason for this is likely that, owing to the spherical form of the metal particles, in contradistinction to the planar pearlescent pigments or planar metallic effect pigments, incident light is not reflected in a directed way and hence is not perceived by an observer to be a strongly reflecting pigment. Instead, spherical metal particles have the capacity to absorb the irradiated laser light to a high degree and, accordingly, to convert it into heat.

By spherical metal particles are meant, for the purposes of the invention, not necessarily an absolutely concentric three-dimensional structure.

Spherical metal particles for the purposes of the invention do not have the plateletlike form of effect pigments, such as pearlescent pigments or metallic effect pigments. The term "spherical form" for the purposes of the invention also refers, for example, to a form which has only an approximately spherical form, an ellipsoidal form, or is multifarious. A multifarious form is characterized in particular in that on a nonplanar body there may be, on the surface, for example, dendritic projections. Moreover, the surface may also have been irregularly shaped. Spherical metal particles of this kind can be obtained, for example, by nozzle spraying or atomization of molten metal. They are produced commercially in large volumes and are available inexpensively, from Ecka Granules (D-91235 Velden, Germany), for example.

In principle spherical metal particles with a wide particle size range can be used for laser marking. Preference, however, is given to using relatively small metal particles. It has emerged, surprisingly, that the distinctness of image, and especially the dot precision, of the laser marking are better when using relatively small metal particles. The dot precision is impaired when even small amounts of excessively large metal particles are present.

Spherical metal particles possess a particle size distribution which commonly has approximately the form of a log-normal distribution. The size distribution is customarily determined by means of laser granulometry.

In the case of this method it is possible to measure the metal particles in the form of a powder. The scattering of the irradiated laser light is detected in different spatial directions and is evaluated in accordance with the Fraunhofer diffraction theory, by means of the Windox software, version 5, release 5.1 that is used in conjunction with the Helos instrument from Sympatec, Germany, in accordance with the manufacturer's instructions. Arithmetically, the particles are treated as spheres. Consequently the diameters determined always relate to the equivalent sphere diameter, averaged over all spatial directions, independently of the actual form of the metal particles. The size distribution determined is that calculated in the form of a volume average (relative to the equivalent sphere diameter). This volume-averaged size distribution can be depicted inter alia as a cumulative undersize curve. The cumulative undersize curve in turn is usually characterized, simplifyingly, by means of defined characteristic values, examples being the $D_{50}$ or $D_{90}$ value. A $D_{90}$ value means that 90% of all of the particles lie below the stated value. Expressed alternatively, 10% of all the particles lie above the stated value. In the case of a $D_{50}$ value, 50% of all the particles lie above, and 50% of all the particles below, the stated value.

The spherical metal particles according to the invention have a particle size distribution with a $D_{99}$ value of <110 µm, a $D_{90}$ value of <75 µm, and a $D_{50}$ value <45 µm. With particular preference the spherical metal particles according to the invention have a $D_{50}$ value in the range from 0.5 to <45 µm.

In the case of excessively coarse spherical metal particles with a particle size distribution having a $D_{99}$ value of >110 µm and a $D_{90}$ value of >75 µm, the desired contrast and in particular the dot precision of the laser marking are unsatisfactory. The same applies if, for example, the particle size distribution of the spherical metal particles has a $D_{99}$ value of <110 µm and a $D_{90}$ value of <75 µm and yet the $D_{50}$ value is >45 µm. Metal particles of such a kind possess a relatively low fine fraction and do not have the advantages described in this invention.

Preferably the $D_{99}$ value is <70 µm and the $D_{90}$ value is <40 µm. Associated herewith preferably are particle size distributions having a $D_{50}$ value of <25 µm. With particular preference the spherical metal particles according to the invention have a $D_{50}$ value in the range from 0.5 to <25 µm. When these relatively fine metal particles are used, the dot precision of the laser marking is further improved.

By dot precision is meant good resolution of the laser marking, without disruptive, individualized, parti-cularly large dots. Disruptive dots of this kind occur particularly when using coarse metal particles.

The spherical metal particles are added to the plastic and processed by extrusion. In the course of this operation it is possible for the individualized particles to be deformed into platelets (flakes or shards) by the shearing forces that occur in the extruder. This deformation is manifested in the plastic by pale, metallically gleaming dots or shards. If this effect is not to occur, then, in a further-preferred embodiment, spherical metal particles having a particle size distribution with a $D_{99}$ value <65 µm and a $D_{90}$ value of <36 µm are to be used. The $D_{50}$ value of the particle size distribution in this case is preferably <20 µm. With particular preference the spherical metal particles of the invention have a $D_{50}$ value in the range from 0.55 to <20 µm.

Particular preference is given to using spherical metal particles having a particle size distribution with a $D_{99}$ value of <55 µm and a $D_{90}$ value of <30 µm. In the case of these spherical metal particles the $D_{50}$ value of the particle size distribution is preferably <18 µm. More preferably the spherical metal particles according to the invention have a $D_{50}$ value in the range from 0.6 to <18 µm. As fineness increases, i.e., as the particle size of the spherical metal particles goes down, it is possible that the distinctness of image and the dot precision of the image or identification applied by laser marking will be increased still further.

Particularly fine grades produce a decidedly high distinctness of image, dot precision, and contrast on laser marking.

It is supposed that, as a result of the use of fine metal particles, on the basis of their high specific surface area, the absorption of laser light and, subsequently, the delivery of energy to the environment of the metal particle takes place in a particularly defined, locally narrowly limited way. Accordingly the laser markings on correspondingly pigmented plastics exhibit the advantages stated.

DETAILED DESCRIPTION

In one especially preferred embodiment, metal particles according to the invention are used that have a particle size distribution with a $D_{99}$ value of <40 µm and a $D_{90}$ value of <20 µm. In the case of these spherical metal particles the $D_{50}$ value of the particle size distribution is preferably <11 µm. With particular preference the spherical metal particles according to the invention have a $D_{50}$ value in the range from 0.65 to <11 µm.

With these very fine metal particles it has surprisingly been found that laser markings of high contrast and dot precision can be obtained at very high laser write speeds. The write speeds of the laser range from 120 to about 10 000 mm/s, preferably from 150 to 8000 mm/s, more preferably from 200 to 2000 mm/s, and very preferably from 230 to 1000 mm/s. The write speed that is achievable in each specific case is dependent here on a large number of parameters, but particularly on the laser power and the pulse frequency. This brings considerable time advantages with it in respect of the throughput rates in the laser marking of objects.

In accordance with a further preferred embodiment of the invention the metal particles according to the invention have a metal oxide content of not more than 15% by weight, based on the total weight of the metal particles. It is further preferred for the metal oxide content of the metal particles to be not more than 10% by weight, and more preferably not more than 5% by weight. A metal oxide content of about 0.3% to 6% by weight and more preferably of 0.4% to 1.5% by weight has proven very suitable.

The low metal oxide contents are advantageous for the rapid absorption of energy from the irradiated laser beam by the metal particles. The lower limit of 0.3% by weight metal oxide content is dictated by the oxide layer that naturally forms on the metals.

The metal oxide content of the metal particles may involve a metal oxide layer formed superficially. By way of example, aluminum particles have a thin layer of aluminum oxide on the surface.

The metal particles thus are composed preferably to an extent of about 80% by weight, more preferably to an extent of about 85% by weight, with further preference to an extent of about 90% by weight, and even more preferably to an extent of about 95% by weight, of metal. The metal particles are preferably composed to an extent of 98.5% to 99.6% by weight of metal.

The metal particles preferably comprise or consist of metals selected from the group consisting of aluminum, copper, silver, gold, zinc, tin, iron, titanium, vanadium, magnesium, and alloys thereof. An alloy need not necessarily be composed exclusively of the aforementioned metals. It is also possible for there to be further metals alloyed with the aforementioned metals or alloys thereof, including metals in the form of impurities, for example. Aluminum, silver, copper, and iron have proven very suitable metals. These metals produce particularly good laser markabilities, even at very low concentrations. One suitable alloy is brass, for example.

In view of the microscale particle size distribution of the metal particles, the laser marking agent of the invention exhibits an extremely high dot precision.

Following irradiation of a laser beam into a plastic which comprises the laser marking agent according to the invention, following irradiation of a laser beam, there is selective heating of the microscale metal particles, transfer of the heat to the surrounding plastic and as a result of the thermally induced polymer breakdown associated therewith, carbonization and/or foaming of the polymers surrounding the metal particles in the plastics matrix. Carbonization and/or foaming occurs depending on the nature of the polymer used and/or depending on the energy input by the laser beam.

Carbonization leads to blackening; foaming leads to a lightening in color, which can lead to up to a kind of whitening. In the majority of cases the desire is for a distinct contrast to the unmarked plastic.

In further embodiments, however, the change in the plastic that is brought about by the thermally induced polymer breakdown may be so small that it cannot be perceived, or not significantly, with the human eye. Marks of this kind can, however, be detected by special read devices. Accordingly such substantially invisible laser markings may find use, for example, for security markings or on CDs.

Further embodiments envision deliberate discoloration of the plastic by admixing of a colorant which undergoes targeted degradation with the irradiated laser light. For instance, this colorant may decompose under the action of the laser light and cause the plastic to become less colored in addition to the blackening or lightening, or if the plastic has added to it further colorants which are not degraded by the laser light, the plastic may take on the inherent color of the colorants.

Since the carbonization and/or foaming takes place only locally around the microscale metal particles, marking can be carried out with high dot precision. A high distinctness of image is manifested by facts which include the fact that a line is perceived not as a collection of individual dots but instead as a continuous straight line, which is composed of a multiplicity of small dots that the human eye is unable to resolve.

It has therefore emerged as being extremely surprising that—although the interaction of the spherical metal particles with visible light is not strong enough to cause graying (clouding) of a plastics material—the interaction with irradiated laser light is nevertheless sufficient to generate the desired carbonization and/or foaming of the polymer matrix surrounding the metal particles and hence to provide the plastics article with a high-contrast identification or marking.

On account of their very high absorption capacities for electromagnetic radiation from the UV through to the IR range, and also on account of their excellent thermal conductivity, the microscale spherical metal particles are especially suitable as laser marking agents and/or laser weldability agents. In their activity in these respects they exceed conventional metal-oxide particles.

The spherical metal particles can be added in the form of a powder to the plastic. More advantageous, however, is the addition of the spherical metal particles in the form of a concentrate or masterbatch. It has emerged that concentrates or masterbatches considerably facilitate the incorporability of the spherical metal particles into plastics.

A masterbatch for the purposes of the present invention comprises spherical metal particles and at least one dispersion carrier.

In the masterbatch the amount of spherical metal particles is 0.001% to 99.9% by weight, based on the total weight of the masterbatch. Preferably the amount of spherical metal particles is 0.5% to 95.0% by weight, more preferably 1.0% to 95% by weight, and more preferably still 5% to 80% by weight, based in each case on the total weight of the masterbatch.

The dispersion carrier may comprise at least one plastics component, waxes, resins, additives, solvents and/or plasticizers.

In the case of a masterbatch which is solid at room temperature (18-25° C.), the dispersion carrier preferably comprises plastics components, waxes, resins and/or additives.

A plastics component used in this context is preferably a polymer which is compatible with the plastics material into which it is to be incorporated. In accordance with one preferred version the plastics component used in the masterbatch of the invention is identical with the plastics material into which laser marking agent is to be incorporated.

Preferred waxes are preferably polyolefin degradation waxes or polyalkylene waxes, propylene waxes for example. A polypropylene wax which has proven very suitable is Licocene® from Clariant, Switzerland.

Preferred resins which can be used in the masterbatch of the invention are phenolic resins, or ketonic resins such as, for example, Laropal A81 from BASF.

Additives which can be added to the laser marking agent include stabilizers, surfactants, defoamers, dispersants, corrosion inhibitors, such as organic phosphoric acids or phosphonic acids, for example, and/or surface-active substances, etc.

The additives may lead, for example, to an improvement in the ease of incorporation of the masterbatch into the plastic. The additives prevent agglomeration or sedimentation of the metal particles in the masterbatch. The additives may be simply mixed together with the spherical metal particles, or the spherical metal particles may be coated with the additives.

In accordance with one further preferred development of the invention the masterbatch includes an additives content which is preferably in a range from 0.001% to 20% by weight, based on the total weight of the masterbatch. In accordance with a further preferred embodiment the additives content is 0.01% to 10% by weight, more preferably 0.1% to 4% by weight, based in each case on the total weight of the masterbatch.

In the case of a masterbatch which is liquid at room temperature (18-25° C.), the dispersion carrier preferably comprises solvents and/or plasticizers. A solvent used with particular preference is white oil.

Plasticizers used are customarily phthalates, adipates, trimellitates, sebacates, tartaric acid derivatives, citric esters, polyesters, phosphates or fatty acid esters.

Preferred examples of these are bis-2-ethyloctyl phthalate, bis-2-ethylhexyl adipate, tri-2-ethylhexyl trimellitate or epoxidized soybean oil.

The masterbatch may comprise further components such as, for example, color pigments and/or dyes.

With regard to the concentration of spherical metal particles in the masterbatch there are two preferred, different ranges distinguished:

In one case, the amount of spherical metal particles in the masterbatch is preferably 80% to 99% by weight and more preferably 85% to 95% by weight, based in each case on the total weight of the masterbatch. In this case it is preferred to add polymer-compatible solvents such as white oil and/or plastics components and also dispersants to the masterbatch.

The amount of the plastics components in the masterbatch in this case is preferably in a range from 0.5% to 20% by weight, more preferably 1% to 15% by weight, and with particular preference from 2% to 10% by weight, based in each case on the total weight of the masterbatch.

In the other case the composition of the masterbatch is already very similar to that of the laser-markable plastic, but the components are present in a more concentrated form.

The amount here of spherical metal particles in the masterbatch is preferably 0.001% to 5% by weight and more preferably 0.5% to 2% by weight, based in each case on the total weight of the masterbatch.

Here the masterbatch comprises predominantly plastics components.

The amount of the plastics component in the masterbatch in this case is preferably in a range from 50% to 99% by weight, more preferably 60% to 98% by weight, and very preferably from 70% to 95% by weight, based in each case on the total weight of the masterbatch.

In this case the masterbatch is preferably either admixed to the plastic prior to extrusion, or metered into the plastic in the course of the extrusion process.

Furthermore, a masterbatch of this kind generally comprises additives and optionally waxes, color pigments and/or dyes.

The masterbatch is produced, for example, in a suitable mixer, such as a tumbler mixer, for example. In this case the spherical metal powder and also, where appropriate, further components is combined with plastics pellets or plastics powder and/or plastics starting material in any presentation form, and the combined formulation is then extruded, for example. The masterbatch can also be produced by metering the spherical powder metal and also, where appropriate, further components directly into the plastics melt in the course of the extrusion process.

Since the laser marking agent according to the invention consists essentially of spherical metal particles, the operation of mixing may also take place under intensive conditions. Deformation of the metal particles to platelets, as are present in the case of the use of metallic effect pigments, is observed only in the case of relatively coarse particles. The resulting mixture may then be subjected directly to further processing, as for example in an extruder or injection molding machine. After the desired plastics molding has been obtained, marking may be carried out by laser beam.

In view of the microscale size of the metal particles it is preferred, for reasons not only of handling but also of health and safety, for the laser marking agent, or a masterbatch thereof, to be present in a low-dust or, preferably, non-dusting preparation.

Consequently, in a further-preferred form, the masterbatch comprising at least the laser marking agent and the plastics component, is in a compacted form. This compacted form comprises granules, tablets, briquettes, sausages or pellets. The solvent content of such compacted forms is 0.01% to 15% by weight and preferably 0.001% to 5% by weight, and likewise preferably 0.0% to <0.1% by weight (in food packaging), based in each case on the total weight of the compacted form. The size of the compacted forms in this case is in a range from 50 µm to 80 mm, preferably 200 µm to 50 mm, more preferably from 500 µm to 25 mm. One very suitable size of the compacted forms of the laser marking agent according to the invention, or of the masterbatch, is situated in a range from 750 µm to 10 mm.

Compaction may be accomplished by here combining spherical metal particles and plastics component and, optionally, a further binder, and subsequently carrying out granulation, pelletizing, tableting, extrusion, compressing, etc. Here, with corresponding temperatures, the plastics component is melted, and thus joins with the spherical metal pigments while retaining the enforced shape.

In a further embodiment the binder is dissolved in a suitable solvent and mixed with the laser marking agent and, where appropriate, other additives. In one embodiment subsequently, with stirring, the solvent is removed again by vacuum and/or elevated temperature. This produces three-dimensional granules of irregular shape. In another embodiment the paste is pelletized or tableted and then dried out.

The aforementioned presentation forms allow a safe handling and incorporation into a plastic, without the danger of a metal dust explosion or adverse health effect.

Extremely advantageous in the case of the present invention is the fact that any clouding or graying of the plastic can be readily covered by addition of colorants. In the prior art, the brown or greenish colorations that occasionally occur are almost impossible to cover, since—in contrast to slight clouding or graying—they constitute a coloration.

In accordance with one further preferred embodiment of the invention, the metal particles are provided with at least one inorganic metal oxide layer.

The at least one inorganic metal oxide layer may be applied separately to the metal particles. As a metal oxide layer it is possible, for example, to apply an $SiO_2$ layer, $Al_2O_3$ layer or $TiO_2$ layer. It is also possible for combinations of metal oxide layers to be applied: for example, first $SiO_2$ and subsequently $TiO_2$, or first $TiO_2$ and subsequently $SiO_2$.

As a metal oxide layer it is preferred to apply an $SiO_2$ layer. The $SiO_2$ layer is preferably applied using sol-gel methods.

Starting compounds used for the $siO_2$ layer are preferably tetraalkoxysilanes. Examples of these are as follows: tetramethoxysilane, tetraethoxysilane, tetrapropoxysilane, tetraisopropoxysilane or tetra-butoxysilane, or mixtures thereof.

The tetraalkoxysilane is first hydrolyzed in a preferably basic environment with addition of water, and subsequently an $SiO_2$ layer is deposited on the metal particles.

To catalyze the $SiO_2$ deposition it is preferred to add nitrogen-containing bases such as ammonia, alkylamines or dialkylamines. Suitable compounds are methylamine, ethylamine, dimethylamine, diethylamine, pyridine, piperazine, etc.

In accordance with a further preferred embodiment it is also possible for an organic-chemical surface modification to have been applied to the metal particles. Between metal particles and organic-chemical surface modification there may also be a metal oxide layer arranged, an $SiO_2$ layer, for example.

In one further variant the organic-chemical surface modification may be an organic-chemical polymer matrix that envelops the metal particles. Such a matrix is applied preferably by targeted polymerization from monomers to the metal particles.

The object on which the invention is based is further achieved by a laser-markable and/or laser-weldable plastic which comprises a laser marking agent, as claimed in particular in claims 1 to 8. Furthermore, the laser-markable and/or laser-weldable plastic may comprise a masterbatch of the invention as claimed in any of claims 9 to 12.

The laser-markable and/or laser-weldable plastic preferably comprises thermoplastic, thermoset or elastomeric plastics. Particular preference here is given to thermoplastics.

Suitable thermoplastic polymers include all of the thermoplastics that are known to a person skilled in the art. Suitable thermoplastic polymers are described in, for example, Kunststoff-Taschenbuch, Saechtling (Ed.), 25th edition, Hanser-Verlag, Munich, 1992, especially chapter 4 and references cited therein, and in Kunststoff-Handbuch, G. Becker and D. Braun (Eds.), volumes 1 to 11, Hanser-Verlag, Munich, 1966 to 1996.

Exemplary mention may be made as suitable thermoplastics of polyoxyalkylenes, polycarbonates (PC), polyesters such as polybutylene terephthalate (PBT) or polyethylene terephthalate (PET), polyolefins such as polyethylene or polypropylene (PP) poly(meth)acrylates, polyamides, vinylaromatic (co)polymers such as polystyrene, impact-modified polystyrene such as HI-PS, or ASA, ABS or AES polymers, polyarylene ethers such as polyphenylene ethers (PPE) polysulfones, polyurethanes, polylactides, halogen-containing polymers, polymers containing imide groups, cellulose esters, silicone polymers, and thermoplastic elastomers. Mixtures of different thermoplastics can also be used as materials for the plastics moldings. These mixtures may be single-phase or multiphase polymer blends.

The plastics to be inscribed or to be joined to one another may consist of identical or different thermoplastics and/or thermoplastic blends.

Polyoxyalkylene homopolymers or copolymers, especially (co)polyoxymethylenes (POM), and processes for preparing them are known per se to a person skilled in the art and are described in the literature. Suitable materials are available commercially under the brand name Ultraform® (BASF AG, Germany). Very generally these polymers contain at least 50 mol % of repeating —$CH_2O$— units in the main polymer chain. The homopolymers are generally prepared by polymerizing formaldehyde or trioxane, preferably in the presence of suitable catalysts. Polyoxymethylene copolymers and polyoxymethylene terpolymers are preferred. The preferred polyoxymethylene (co)polymers have melting points of at least 150° C. and molecular weights (weight average) M in the range from 5000 to 200 000, preferably from 7000 to 150 000 g/mol. Endgroup-stabilized polyoxymethylene polymers which have C—C bonds at the chain ends are particularly preferred.

Suitable polycarbonates are known per se and are obtainable, for example, in accordance with DE-B-1 300 266 by interfacial polycondensation or in accordance with DE-A-14 95 730 by reaction of biphenyl carbonate with bisphenols. A preferred bisphenol is 2,2-di(4-hydroxyphenyl)propane, referred to generally as bisphenol A. The relative viscosity of these polycarbonates is situated in general in the range from 1.1 to 1.5, in particular from 1.28 to 1.4 (measured at 25° C. in a 0.5% strength by weight solution in dichloromethane). Suitable polycarbonates are available commercially under the brand name Lexan® (GE Plastics, B.V., The Netherlands).

Suitable polyesters are likewise known per se and described in the literature. In their main chain they contain an aromatic ring which originates from an aromatic dicarboxylic acid. The aromatic ring may also be substituted, as for example by halogen such as chlorine and bromine or by $C_1$-$C_4$ alkyl groups such as methyl, ethyl, isopropyl and n-propyl, and n-butyl, isobutyl and/or tert-butyl groups. The polyesters can be prepared by reacting aromatic dicarboxylic acids, their esters or other ester-forming derivatives thereof with aliphatic dihydroxyl compounds in a manner known per se. Preferred dicarboxylic acids include naphthalenedicarboxylic acid, terephthalic acid, and isophthalic acid or mixtures thereof. Up to 10 mol % of the aromatic dicarboxylic acids may be replaced by aliphatic or cycloaliphatic dicarboxylic acids such as adipic acid, azelaic acid, sebacic acid, dodecanedioic acids, and cyclohexanedicarboxylic acids. Preference among the aliphatic dihydroxy compounds is given to diols having 2 to 6 carbon atoms, especially 1,2-ethanediol, 1,4-butanediol, 1,6-hexanediol, 1,4-hexanediol, 1,4-cyclohexanediol, and neopentyl glycol or mixtures thereof. Particularly preferred polyesters include polyalkylene terephthalates which derive from alkanediols having 2 to 6 C atoms. Of these, particular preference is given to polyethylene terephthalate (PET), polyethylene naphthalate, and polybutylene terephthalate (PBT). These products are available commercially, for example, under the brand names Rynite® (PET; DuPont, USA) and Ultradur® (PBT; BASF AG). The viscosity number of the polyesters is situated generally in the range from 60 to 200 ml/g (measured in a 0.5% strength by weight solution in a phenol/o-dichlorobenzene mixture (weight ratio 1:1 at 25° C.)).

Very generally, polyethylene and polypropylene and also copolymers based on ethylene or propylene, where appropriate also with higher α-olefins, represent suitable polyolefins. Corresponding products are available, for example, under the trade names Lupolen® and Novolen®. The term "polyolefins" should also be taken to include ethylene-propylene elastomers and ethylene-propylene terpolymers.

Among the poly(meth)acrylates, mention may be made in particular of polymethyl methacrylate (PMMA) and also copolymers based on methyl methacrylate with up to 40% by weight of further copolymerizable monomers, such as n-butyl acrylate, tert-butyl acrylate or 2-ethylhexyl acrylate, such polymers being obtainable, for example, under the names Lucryl® (BASF AG) or Plexiglas® (Röhm GmbH, Germany). For the purposes of the invention, these also include impact-modified poly(meth)acrylates and also mixtures of poly(meth)acrylates and SAN polymers which have been impact-modified with polyacrylate rubbers (an example being the commercial product Terlux® from BASF AG).

Suitable polyamides are those with an aliphatic, partially crystalline or partially aromatic or amorphous construction, of any kind, and their blends, including polyetheramides such as polyether-block-amides. By polyamides are meant all known polyamides. Suitable polyamides generally have a viscosity number of 90 to 350, preferably 110 to 240 ml/g (determined in a 0.5% strength by weight solution in 96% strength by weight sulfuric acid at 25° C. in accordance with ISO 307). Semicrystalline or amorphous resins with a molecular weight (weight average) of at least 5000 g/mol, of the kind described, for example, in U.S. Pat. Nos. 2,071,250, 2,071,251, 2,130,523, 2,130,948, 2,241,322, 2,312,966, 2,512,606, and 3,393,210, are preferred. Examples thereof are polyamides which derive from lactams having 7 to 13 ring members, such as polycaprolactam, polycapryl-lactam, and polylauryllactam, and also polyamides which are obtained from reacting dicarboxylic acids with diamines.

Dicarboxylic acids which can be used are alkane-dicarboxylic acids having 6 to 12, more particularly 6 to 10, carbon atoms, and aromatic dicarboxylic acids. Mention may be made here of adipic acid, azelaic acid, sebacic acid, dodecanedioic acid (i.e., decane-dicarboxylic acid) and/or isophthalic acid as acids.

Particularly suitable diamines are alkanediamines having 6 to 12, more particularly 6 to 8, carbon atoms and also m-xylylenediamine, di(4-aminophenyl)methane, di(4-aminocyclohexyl)methane, 2,2-di(4-aminophenyl)-propane or 2,2-di (4-aminocyclohexyl)propane.

Preferred polyamides are polyhexamethyleneadipamide (PA66), e.g., the commercial product Ultramid® A (BASF AG), and polyhexamethylenesebacamide (PA 610), e.g., the commercial product Nylon 610 (DuPont) polycaprolactam (PA 6), e.g., the commercial product Ultramid® B (BASF AG), and also copolyamides 6/66, in particular with a fraction of 5% to 95% by weight of caprolactam units, e.g., the commercial product Ultramid® C (BASF AG). PA 6, PA 66, and copolyamides 6/66 are particularly preferred.

Mention may also be made, moreover, of polyamides which are obtainable, for example, by condensation of 1,4-diaminobutane with adipic acid at elevated temperature (polyamide-4,6). Preparation processes for polyamides of this structure are described in, for example, EP-A 38 094, EPA 38 582, and EP-A 39 524.

Further examples are polyamides which are obtainable by copolymerizing two or more of the aforementioned monomers, or mixtures of two or more polyamides, the mixing ratio being arbitrary.

Moreover, partially aromatic copolyamides of this kind, such as PA 6/6T and PA 66/6T with a triamine content of less than 0.5%, preferably less than 0.3%, by weight (see EP-A 299 444) have proven particularly advantageous. The preparation of the low-triamine-content partially aromatic copolyamides may be accomplished in accordance with the processes described in EP-A 129 195 and 129 196.

Further suitable thermoplastic materials are vinylaromatic (co)polymers. The molecular weight of these polymers, which are known per se and are available commercially, is situated in general in the range from 1500 to 2 000 000, preferably in the range from 70 000 to 1 000 000 g/mol.

Merely by way of representation, mention may be made here of vinylaromatic (co)polymers of styrene, chlorostyrene, α-methylstyrene, and p-methylstyrene; in minor proportions, preferably not more than 20%, in particular not more than 8%, by weight, comonomers such as (meth)acrylonitrile or (meth) acrylic esters may also be involved in the construction. Particularly preferred vinylaromatic (co)monomers are polystyrene, styrene-acrylonitrile (SAN) copolymers, and impact-modified polystyrene (HIPS=high impact polystyrene). It is understood that mixtures of these polymers as well can be used. Preparation takes place preferably by the process described in EP-A-302 485.

Furthermore, ASA, ABS, and AES polymers (ASA=acrylo-nitrile-styrene-acrylic ester, ABS=acrylonitrile-butadiene-styrene, AES=acrylonitrile-EPDM rubber-styrene) are particularly preferred. These impact-tough, vinylaromatic polymers comprise at least one rubber-elastic graft polymer and a thermoplastic polymer (matrix polymer). Matrix material commonly employed is a styrene/acrylonitrile (SAN) polymer. It is preferred to use graft polymers which comprise as their rubber

- a diene rubber based on dienes, such as butadiene or isoprene, for example, (ABS);
- an alkyl acrylate rubber based on alkyl esters of acrylic acid, such as n-butyl acrylate and 2-ethylhexyl acrylate, (ASA);
- an EPDM rubber based on ethylene, propylene and a diene, (AES); or mixtures of these rubbers and/or rubber monomers.

The preparation of suitable ABS polymers is described in depth in—for example—German patent application DE-A 19728629. For the preparation of ASA polymers, recourse may be made, for example, to EP-A 99 532. Details of the preparation of AES polymers are disclosed in, for example, U.S. Pat. Nos. 3,055,859 or 4,224,419. Reference is hereby made expressly to the patent specifications cited in this paragraph.

Polyarylene ethers are preferably polyarylene ethers per se, polyarylene ether sulfides, polyarylene ether sulfones or polyarylene ether ketones. Their arylene groups may be alike or different and independently of one another may denote an aromatic radical having 6 to 18 C atoms. Examples of suitable arylene radicals are phenylene, bisphenylene, terphenylene, 1,5-naphthylene, 1,6-naphthylene, 1,5-anthrylene, 9,10-anthrylene or 2,6-anthrylene. Of these, preference is given to 1,4-phenylene and 4,4'-biphenylene. Preferably these aromatic radicals are not substituted. However, they may carry one or more substituents. Suitable polyphenylene ethers are available commercially under the Noryl® designation (GE Plastics B.V., The Netherlands).

In general the polyarylene ethers have average molecular weights M (number average) in the range from 10 000 to 60 000 g/mol and viscosity numbers of 30 to 150 ml/g. Depending on the solubility of the polyarylene ethers, the viscosity numbers are measured either in 1% strength by weight N-methylpyrrolidone solution, in mixtures of phenol and o-dichlorobenzene, or in 96% strength sulfuric acid, in each case at 20° C. or 25° C.

The polyarylene ethers are known per se or can be prepared by methods that are known per se.

Preferred process conditions for the synthesis of polyarylene ether sulfones or polyarylene ether ketones are described in, for example, EP-A 113 112 and EP-A 135 130. Polyarylene ether sulfones generally have a melting point of at least 320° C., polyarylene ether ketones one of at least 370° C. Suitable polyphenylene ether sulfones are available commercially, for example, under the Ultrason® E designation (BASF AG), suitable polyphenylene ether ketones under the Victrex® designation.

Furthermore, polyurethanes, polyisocyanurates, and polyureas are suitable materials for producing the plastics moldings. Soft, half-hard or hard, thermoplastic or crosslinked polyisocyanate polyaddition products, examples being polyurethanes, polyisocyanurates and/or polyureas, especially polyurethanes, are general knowledge and are available commercially under designations including that of Elastolan® (Elastogran GmbH, Germany). Their preparation is diversely described and is typically accomplished by reaction of isocyanates with isocyanate-reactive compounds under conditions which are general knowledge. The reaction is carried out preferably in the presence of catalysts and/or auxiliaries. When the products are foamed polyisocyanate polyaddition products, they are produced in the presence of customary blowing agents.

Suitable isocyanates include the aromatic, arylaliphatic, aliphatic and/or cycloaliphatic organic isocyanates that are known per se, preferably diisocyanates.

Isocyanate-reactive compounds which can be used include, for example, common-knowledge compounds having a molecular weight of 60 to 10 000 g/mol and a functionality with respect to isocyanates of 1 to 8, preferably 2 to 6 (in the case of thermoplastic polyurethanes, TPU, a functionality of about 2) examples being polyols having a molecular weight of 500 to 10 000 g/mol, e.g., polyether polyols, polyester polyols, polyether polyester polyols, and/or diols, triols and/or polyols having molecular weights of less than 500 g/mol.

Polylactides, in other words polymers of lactic acid, are known per se or can be prepared by processes that are known per se. Besides polylactide it is also possible to use copolymers or block copolymers based on lactic acid and further monomers. Usually linear polylactides are used. However, branched lactic acid polymers can be used as well. Serving as branching agents may be, for example, polyfunctional acids or alcohols.

Suitable halogen-containing polymers include, in particular, polymers of vinyl chloride, especially polyvinyl chloride (PVC) such as unplasticized PVC and plasticized PVC, and copolymers of vinyl chloride such as PVC-U molding compounds.

Additionally suitable are fluorine-containing polymers, especially polytetrafluoroethylene (PTFE), tetrafluoro-ethylene-perfluoropropylene copolymers (FEP), copolymers of tetrafluoroethylene with perfluoroalkyl vinyl ether, ethylene-tetrafluoroethylene copolymers (ETFE), polyvinylidene fluoride (PVDF), polyvinyl fluoride (PVF), polychlorotrifluoroethylene (PCTFE) and ethylene-chlorotrifluoroethylene copolymers (ECTFE).

Polymers containing imide groups are, in particular, polyimides, polyetherimides, and polyamidimides.

Suitable cellulose esters are for instance cellulose acetate, cellulose acetobutyrate, and cellulose propionate.

Also suitable in addition as thermoplastics are silicone polymers. Silicone rubbers in particular are suitable. These are customarily polyorganosiloxanes which have groups capable of crosslinking reactions.

Polymers of this kind are described in, for example, Römpp Chemie Lexikon, CD-ROM version 1.0, Thieme Verlag Stuttgart 1995.

Finally it is also possible to employ the class of compound of the thermoplastic elastomers (TPE). TPE can be processed like thermoplastics but have rubber-elastic properties. TPE block polymers, TPE graft polymers, and segmented TPE copolymers comprising two or more monomer units are suitable. Particularly suitable TPE are thermoplastic polyurethane elastomers (TPE-U or TPU), styrene oligoblock copolymers (TPE-S) such as SBS (styrene-butadiene-styrene-oxy block copolymer) and SEES (styrene-ethylene-butylene-styrene block copolymer, obtainable by hydrogenating SBS), thermoplastic polyolefin elastomers (TPE-O) thermoplastic polyester elastomers (TPE-E) thermoplastic polyamide elastomers (TPE-A), and, in particular, thermoplastic vulcanisates (TPE-V). A person skilled in the art finds details on TPE in G. Holden et al., Thermoplastic Elastomers, 2nd edition, Hanser Verlag, Munich 1996.

The laser marking agent of the invention can be incorporated outstandingly into the aforementioned thermoplastics. From the then resultant plastic/laser marking agent mixture it is then possible, by thermal forming, to produce the desired shaped articles, examples being bottles, cups, trays, etc.

The laser-markable and/or laser-weldable plastic of the invention can be produced by a process in which the above-described spherical metal particles are introduced into the plastics material. The amounts of the metal particles introduced may be set as a function of plastics and/or intended use. The introduction of the particles into the plastics material may take place in a customary mixer or else in an extruder in a conventional manner. A method of producing the laser-markable and/or laser-weldable plastic, in which spherical metal particles are introduced into a plastics material, is likewise provided by the present invention.

In accordance with one preferred embodiment the fraction of the metal particles in the laser-markable and/or laser-weldable plastic is 0.0005% to 0.8% by weight, preferably 0.001% to 0.5% by weight, the amounts being based in each case on the total weight of the plastic.

Surprisingly the advantageous properties of the laser-markable and/or laser-weldable plastic of the invention can be achieved even with very low levels of laser marking agent. Below 0.0005% by weight of laser marking agent, the advantages according to the invention can be found no longer or only in a very restricted form.

It is preferred, moreover, for the fraction of the metal particles in the plastic to be 0.005% to 0.5% by weight, even more preferably 0.01% to 0.2% by weight, based in each case on the total weight of the laser-markable plastic.

With regard to the metals used it has emerged that, at low concentrations, metal particles consisting of aluminum, silver, copper or iron in particular gave the best results. A further preferred embodiment thus consists of plastics comprising spherical metal particles comprising these metals or alloys of these metals, preferably in concentrations of 0.0005% to 0.015% by weight, based on the total plastic.

The present invention allows plastics which can be given a high-contrast mark or inscription with a laser beam to be produced.

From an amount of 0.2% by weight upward, based on the total weight of the plastic, the material may become opaque. In an amount range between 0.05% by weight and 0.2% by weight, the first clouding may occur, and may rise as the concentration goes up to form a grayish coloration of the material. Above 0.8% by weight, the plastic is generally too opaque. Moreover, no further advantage in the quality of laser markability is perceptible. Consequently the use of more laser marking agent would only unnecessarily increase the production costs of the laser-markable plastic.

In an individual case, the amount of spherical metal particles in the plastic may be adjusted in dependence on the layer thickness of the material to be marked; in this context, preferably, the amount of spherical metal particles can be increased as the layer thickness of the plastic goes down.

Hence the layer thickness of a film is customarily within a range from 20 µm to about 5 mm. The thickness of injection-molded plastics can amount up to about 6 cm.

In the case of a film it is possible to increase the amount of spherical metal particles in comparison to a plastics molding. In the case of a plastics molding, for example, it is possible to use an amount of 0.005% by weight of spherical metal particles, whereas, in the case of a film, an amount of 0.02% by weight of spherical metal particles may be suitable. The appropriate amount of spherical metal particles may be determined readily by a person skilled in the art on the basis of experiments.

High-contrast marking of a plastic is possible—as will be shown in the examples—even with a concentration of metal particles of 0.005% by weight. These concentration figures in % by weight are based in each case on the total weight of the material and of the metal particles.

In the case of a layer thickness of the plastic in a range from 20 µm to 500 µm, the fraction of metal particles is situated preferably in a range from 0.005% to 0.2% by weight, more preferably from 0.02 to 0.05, based in each case on the total weight of plastic and metal particles.

In the case of a layer thickness of the plastic in the range from 500 µm to 2 mm, the fraction of metal particles is preferably in a range from 0.001% to 0.1% by weight, more preferably from 0.005 to 0.05, based in each case on the total weight of plastic and metal particles.

It has been found, entirely surprisingly, that—as will be shown in the examples—a plastic which comprises metal particles with an amount in a range from 0.005% up to 0.05% by weight is completely transparent and at the same time can be marked outstandingly with a laser beam with high contrast. Preference is given to operating in a concentration range from 0.01% to 0.04% by weight of metal particles.

The small amount of laser marking agent to be used affords a number of advantages at once. Thus the materials properties of the plastics material are unaffected, or not substantially affected, by the addition of the laser marking agent of the invention.

In the case of the use of metal particles in a range from 0.001% to 0.05% by weight in a transparent or clear plastics material, therefore, there is no deterioration, or no substantial deterioration, in the transparency and/or the color properties of the material doped with the laser marking agent of the present invention, and yet, surprisingly, high-contrast marking or identification with a laser beam is possible.

Furthermore, the present invention allows the extremely inexpensive provision of a plastics material, since the laser marking agent is produced from inexpensive materials and need only be added in a minor extent to the material to be marked. This is a key economic advantage of the present invention.

For certain applications it is advantageous if the plastic of the invention contains essentially no pearlescent pigments. The disadvantages of pearlescent pigments in laser-markable plastics have already been stated earlier on above: pearlescent pigments accentuate the unwanted flow lines which are present in most cases in plastics and lead to a color change, i.e. to a pearl luster effect. In certain cases this is desired on decorative grounds; in many cases, however, the laser marking agent is intended not to influence the coloristic properties of the plastic—in other words, the laser marking agent must be transparent. The plastic itself is likewise to be colorlessly transparent or else to be given a monochrome coloration (e.g., blue, red, yellow, etc.). A decorative coloration through pearl luster is not desired in these cases.

The plastics of the invention ought therefore to contain pearlescent pigments at most in amounts in which they are still transparent in their effect and give rise to no flow lines. Accordingly the laser-markable and/or laser-weldable plastics of the invention can comprise pearlescent pigments in concentrations of 0% to 0.1% by weight, preferably of 0.0% to 0.05% by weight, based on the total plastic. The precise concentrations below which the deleterious properties of the pearlescent pigments are no longer observed are dependent of course on further parameters such as, in particular, the layer thickness of the plastic, but can be determined readily by a person skilled in the art.

With particular preference, laser-markable and/or laser-weldable plastics of the invention of this kind contain no pearlescent pigments.

The laser-markable and/or laser-weldable plastics of the invention may further comprise customary adjuvants. These adjuvants may be selected, for example, from the group consisting of fillers, additives, plasticizers, lubricants or mold release agents, impact tougheners, color pigments, dyes, flame retardants, antistats, optical brighteners, antioxidants, antimicrobially active biostabilizers, chemical blowing agents or organic crosslinking agents, and also other adjuvants, or mixtures thereof.

Examples of fillers which can be used are as follows $CaCO_3$(e.g., Omya, Cologne; Ulmer Füllstoff Vertrieb), dolomite (e.g., Zieglar, Wunsiedel; Blancs Mineraux de Paris), $CaSO_4$ (US Gypsum, Chicago), silicates (Degussa, Frankfurt; Quarzwerke, Frechen), glass beads (Potter; GB; Owens Corning, Wiesbaden), talc (Norwegian Talc; Nordbayrische Farben-und Mineralwerke, H of), kaolin (AKW, Hirschau; Luh, Walluf), mica (Norwegian Talc; Dorfner, Hirschau), feldspar (Omya, Paris), silicate beads (Langer, Ritterhude), silica (see silicates) $BaSO_4$ (Sachtleben, Duisburg, Scheruhn, H of), $Al_2O_3$ or $Al(OH)_3$ (both: Martinswerk, Bergheim).

The additives may comprise, for example, dispersing additives, antioxidants, metal deactivators and/or light stabilizers and UV stabilizers.

Suitable antioxidants (heat stabilizers) are, for instance, sterically hindered phenols, hydroquinones, arylamines, phosphites, various substituted representatives of this group, and also mixtures thereof. They are available commercially for instance as Topanol® (ICI, London), Irgafos®, Irganox® (both Ciba-Geigy, Basel), Hostanox® (Clariant, Frankfurt) or Naugard® (Uniroyal, GB).

Examples of metal deactivators which can be used are as follows: carboxamides, hydrazones, hydrazines, melamine derivatives, benzotriazoles, phosphonic esters and/or thiazole derivatives.

Examples: Hostanox (Clariant, Frankfurt), Irganox (Ciba Geigy, Basel), Naugard (Uniroyal, GB).

Examples of light stabilizers and UV stabilizers which can be used are as follows: benzophenones, benzotriazoles, organic Ni compounds, salicylic esters, cyanocimminic esters, benzylidenemalonates, benzoic esters, oxalanilides and/or sterically hindered amines, which may be monomeric and polymeric.

Examples: Chimasorb, Tinuvin (both Ciba-Geigy, Basel), Cyasorb (American Cyanamid), Hostavin (Clariant, Frankfurt), Uvinul (BASF, Ludgwigshafen).

Examples of plasticizers which can be used are as follows: phthalic esters, phosphoric esters, adipic esters, azelaic esters, glutaric esters, sebacic esters, fatty acid esters, preferably oleates, stearates, rizinolates, laurates and/or octoates, with pentaerythritol, glycols, glycerol, etc., epoxidized fatty acid esters, citric esters, polyesters, benzoic esters, trimellitic esters, sulfonic esters, sulfamides, anilides, addition polymers, polycondensates, polyethylene glycols, abietic esters and/or derivatives, esters of acetic, propionic, butyric, ethylbutyric and/or ethylhexanoic acid.

Examples: Carbowax (DOW, Belgium), Cetamoll (BASF, Ludwigshafen), Edenol (Henkel, Dusseldorf), Elvaloy (DuPont de Nemours, USA), Lankroflex, (Lankro, GB), Palamoll, Palatinol (both BASF, Ludwigshafen).

Examples of lubricants which can be used are as follows: fatty alcohols, dicarboxylic esters, fatty acids of glycerol and of other short-chain alcohols, fatty acids, fatty acid amides, metal salts of fatty acids, oligomeric fatty acid esters, fatty alcohol-fatty acid esters, wax acids and their esters and soaps, polar polyethylene waxes and derivatives, apolar polyolefin waxes, natural and synthetic paraffins, silicone oils and/or fluoropolymers.

Examples: Licowax, Ceridust, Licolub, Licomont (all Clariant, Frankfurt), Irgawax (Ciba-Geigy, Basel) Loxiol (Henkel, Dusseldorf), Barolub (Barlocher, Munich).

Examples of impact modifiers which can be used are as follows: elastomers (EPM and EPDM), polyacrylates, polybutadiene, textile glass fibers, aramid fibers and/or carbon fibers.

The colorants may be inorganic pigments and/or organic pigments and/or organic dyes. However, essentially no effect pigments are used.

Examples of flame retardants which can be used are as follows: suitable flame retardants are, for example, the halogen-containing compounds that are known to a person skilled in the art, alone or together with antimony trioxide, or phosphorus compounds, magnesium hydroxide, red phosphorus, and other common compounds or mixtures thereof. Known flame retardants include, for example, the phosphorus compounds disclosed in DE-A 196 326 75 or those disclosed in Encyclopedia of Chemical Technology, R. Kirk and D. Othmer (Eds.), vol. 10, 3rd edn., Wiley, New York, 1980, pages 340 to 420, such as phosphates, e.g., triaryl phosphates such as triscresyl phosphate, phosphites, e.g., triaryl phosphites or phosphonites. Phosphonites used are generally bis(2,4-ditert-butylphenyl)phenyl-phosphonite, tris(2,4-di-tert-butylphenyl) phosphonite, tetrakis(2,4-di-tert-butyl-6-methylphenyl) 4,4'-bi-phenylenedisphosphonite, tetrakis(2,4-di-tert-butyl-phenyl) 4,4'-biphenylylenedisphosphonite, tetrakis(2,4-dimethylphenyl) 1,4-phenylylenedisphosphonite, tetrakis(2,4-di-tert-butylphenyl) 1,6-hexylylene-disphosphonite and/or tetrakis(3,5-dimethyl-4-hydroxy-phenyl) 4,4'-biphenylylenedisphosphonite, tetrakis(3,5-di-tert-butyl-4-hydroxyphenyl) 4,4'-biphenylylene-disphosphonite.

Examples: Fire Fighters (Great Lakes Chemicals), Fyrol (Dead Sea Bromine, Israel), Martinal (Martinswerk, Bergheim), Reofos (Ciba-Geigy, Basel), Phosflex (Akzo Chemicals, USA).

Examples of antistats which can be used are as follows: ethoxylated fatty amines, aliphatic sulfonates, quaternary ammonium compounds and/or polar fatty acid esters.

Examples: Bärostat (Bärlocher, Munich), Dehydat (Henkel, Dusseldorf), Hostastat (Clariant, Frankfurt) Irgastat (Ciba-Geigy, Basel).

Examples of optical brighteners which can be used are as follows: bisbenzotriazoles, phenylcoumarin derivatives, bisstyrylbiphenyls and/or pyrenetriazines, Examples: Hostalux (Clariant, Frankfurt), Uvitex (Ciba-Geigy, Basel).

Examples of antimicrobially active biostabilizers that can be used include the following: 10,10'-oxy-bisphenoxarsine, N-(trihalomethylthio)phthalimide, diphenylantimony 2-ethylhexanoate, Cu-8-hydroxy-quinoline, tributyltin oxide and/or derivatives thereof Examples: Cunilate (Ventron, B), Preventol (Bayer, Leverkusen), Fungitrol (Tenneco, USA).

Examples of chemical blowing agents which can be used are as follows: azodicarbonamide and derivatives, hydrazine derivatives, semicarbazides, tetrazoles, benzoxazines and/or citric acid+$NaHCO_3$.

Examples: Hydrocerol 8 (Böhringer, Ingelheim), Porofor (Bayer, Leverkusen), Genitron (Schering, GB).

Examples of organic crosslinking agents which can be used are as follows: diaralkyl peroxides, alkyl aralkyl peroxides, dialkyl peroxides, tert-butyl peroxybenzoate, diacyl peroxides and/or peroxyketals. Examples: Interox (Peroxidchemie, Hollriegelskreuth) Luperco, Luperox (Luperox, Günzburg).

In accordance with one preferred version of the present invention the laser-markable and/or laser-weldable plastic is a polymeric film or a label, preferably an adhesive label.

Products, including foods, are customarily wrapped with transparent polymeric films.

A polymeric film produced using the present invention thus permits contactless and unalterable inscription or identification. The inscribing or identifying of the polymeric film may take place both before and after wrapping of the product.

In one version of the present invention the plastic takes the form of a label, preferably an adhesive label. In the case of products which are provided not with a polymeric film but instead only with an adhesive label, the configuration of the plastic in the form of an adhesive label likewise affords the opportunity for inscription and/or identification of the labels using a laser beam.

In accordance with a further embodiment of the present invention the plastic is in the form of a three-dimensional plastics body, preferably a plastics container. On the plastics container it is possible to indicate, for example, the maximum keeping life of foods, chemicals, drugs, etc.

The three-dimensional plastics body may also take the form, for example, of a data medium such as a CD, DVD, CD-ROM, etc. On the basis of an abrasion-resistant and unalterable identification, it is possible to tell the original from counterfeits. The three-dimensional plastics body may also, for example, be a blister strip in which drugs are customarily sold in tablet or capsule form. For example, labels or plastics, especially plastics containers, can be provided with a bar code by laser beam.

In further embodiments according to the invention, the laser-markable and/or laser-weldable plastic may be a constituent of an article which itself need not be laser-markable and/or laser-weldable.

Inscription with a standard commercial laser is accomplished by introducing a sample body into the beam path of a laser. The marking obtained is determined by the irradiation time (or pulse number in the case of pulsed lasers) and irradiation output of the laser and also of the plastics system. The output of the lasers used is dependent on the particular application and may be readily determined in each individual case by a person skilled in the art.

Suitable in principle are all customary lasers, examples being gas lasers and solid-state lasers. Gas lasers are, for example (indicated in brackets is the typical wavelength of the radiation emitted): $CO_2$ lasers (10.6 μm) argon gas lasers (488 nm and 514.5 nm), helium-neon gas lasers (543 nm, 632.8 nm, 1150 nm), krypton gas lasers (330 to 360 nm, 420 to 800 nm), hydrogen gas lasers (2600 to 3000 nm) and nitrogen gas lasers (337 nm).

Solid-state lasers are, for example (in brackets the typical wavelength of the radiation emitted): Nd:YAG lasers ($Nd^{3+}$ $Y_3Al_5O_{12}$) (1064 nm) high-performance diode lasers (800 to 1000 nm), ruby lasers (694 nm), $F_2$ excimer lasers (157 nm), ArF excimer lasers (193 nm) KrCl excimer lasers (22 nm), KrF excimer lasers (248 nm), XeCl excimer lasers (308 nm), XeF excimer lasers (351 nm), and frequency-multiplied Nd:YAG lasers with wavelengths of 532 nm (frequency-doubled), 355 nm (frequency-tripled) or 266 nm (frequency-quadrupled).

Preferred lasers for laser inscribing are the Nd:YAG laser ($Nd^{3+}Y_3Al_5O_{12}$) (1064 nm).

Preferred for laser weldability is the Nd:YAG laser ($Nd^{3+}$ $Y_3Al_5O_{12}$) (1064 nm) and also the high-performance diode laser (800 to 1000 nm), both of which emit in the shortwave infrared.

The lasers used are operated typically at outputs of 1 to 400, preferably 5 to 100, and more particularly 10 to 50 watts.

The energy densities of the lasers used are situated in general in the range from 0.3 $mJ/cm^2$ to 50 $J/cm^2$, preferably 0.3 $mJ/cm^2$ to 10 $J/cm^2$. In the case of the use of pulsed lasers, the pulse frequency is generally in the range from 1 to 30 kHz. Corresponding lasers which can be used in the present context are available commercially.

One very great advantage of the laser marking agent of the invention is that the wavelength of the laser beam does not have to be set specifically for the spherical metal particles. In contrast to metal oxides, metals have a broad absorption capacity, and this is why a very wide variety of lasers with different wavelengths can be used for laser marking a plastic doped with the laser marking material of the invention.

The prior art sometimes uses metal oxides such as antimony-doped tin oxide as absorber materials.

Irrespective of the toxicological risks, these oxides require the use of a defined laser light wavelength in order to effect marking, which complicates handling.

The use of a plastic doped with the laser marking agent of the invention may be in all the fields where customary printing processes have to date been used to inscribe plastics. For example, shaped articles made from plastic doped with the laser marking agent of the invention may find application in the electrical, electronics, and automotive industries. The identification and inscription of, for example, cables, leads, trim strips, and functional parts in the heating, ventilation, and cooling segments, or switches, plugs, levers, and handles made of plastic doped with the laser marking agent of the invention, can be marked with the aid of laser light, even at places which are difficult to access.

Furthermore, plastics systems doped with the laser marking agent of the invention may be employed for packaging in the food segment or in the toy segment. Particular features of the marks on the packs are that they are wipe-resistant and scratch-resistant, are stable in the case of subsequent sterilization operations, and can be applied in a hygienically clean way in the marking operation.

A further important field of application for laser inscription is that of plastic tags for the individual identification of animals, known as cattle tags or ear tags. Via a barcode system, the information specific to the animal is stored. This information can be called up again on demand with the aid of a scanner. The inscription must be very durable, since the ear tags remain on the animals for several years in some cases.

Laser-markable plastics comprise thermoplastics, thermosets, elastomers or rubber.

Laser-weldable plastics naturally always comprise thermoplastics.

In a further embodiment, the laser marking agents are used in plastics for subsurface laser engraving for the generation of two- or three-dimensional image structures. Subsurface laser engraving processes are described in DE 10 2005 011 180 A1, for example. Spherical metal powders, which are particularly suitable for these purposes, comprise a particle size distribution used with a $D_{99}$ value <40 µm and a $D_{90}$ value of <20 µm. In the case of these spherical metal particles the $D_{50}$ value of the particle size distribution is preferably <11 µm.

EXAMPLES

The present invention is illustrated with reference to the examples below, though without being restricted thereto.

Inventive Example 1

A powder of spherical aluminum particles (ECKART GmbH & Co. KG, Fürth, Germany) having a $D_{50}$ value of 1.57 µm, a $D_{90}$ value of 3.37 µm and a $D_{99}$ value of 7.55 µm (determined by means of laser granulometry using a Helos instrument from Sympatec, Germany) was processed in a mixture with thermoplastic polypropylene (PP) (R 771-10; DOW, Germany, Wesseling) by injection molding to form plates (area 42×60 mm, thickness 2 mm).

To prepare a 1% by weight mixture, the procedure used was as follows:

495 g of polypropylene pellets and 5 g of the aluminum powder were mixed in a tumble mixer and then processed to pellets in a twin-screw extruder (Bersdorff, Germany, diameter 25 mm, 28 L/D) without addition of further additives at a processing temperature of about 230° C. These pellets were subsequently processed using an injection molding machine (Arburg Allrounder 221-55-250) at the particular processing temperature specific to the material (e.g., PP 260° C.) to give the specimen plaques having the dimensions specified above.

Concentration series were produced in polypropylene with addition of 1.0%, 0.5%, 0.2%, 0.1%, 0.05%, 0.02%, 0.01%, 0.005%, and 0% by weight of spherical aluminum particles, and the plaques obtained in each case were inscribed using an Nd:YAG laser (wavelength: 1064 nm; output: 8 W, pulse frequency: 5 KHz; write speeds: 50-250 mm/s). The figures in % by weight are based in each case on the total weight of aluminum particles and PP.

PP plates containing no spherical aluminum particles could not be marked with the Nd:YAG laser.

When the spherical aluminum particles were used, it was possible, above an amount of 0.005% by weight relative to PP, to obtain high-contrast, dark and abrasion-resistant marks which exhibited excellent edge definition and dot precision. The PP plates remained transparent and color-neutral.

In the case of an amount of spherical aluminum particles in a range of 0.05-0.5% by weight, increasingly a grayish coloration was found, which accompanied a loss of transparency. PP plates with a spherical aluminum particles content of more than 0.5% by weight were gray-opaque.

No disruptive coarse particles or shards at all were observed. Moreover, even at low concentration ranges (0.005-0.02% by weight), with relatively high write speeds (150-200 nm/s, 8 W, pulse frequency: 5 KHz) of the laser, excellent dot precisions and high contrasts were ensured.

It was not possible to observe any flow lines or streaks in the PP plates which contained the spherical aluminum particles.

Inventive Example 2

Spherical aluminum particles (ECKART) having a $D_{50}$ value of 2.50 µm, a $D_{90}$ value of 5.46 µm, and a $D_{99}$ value of 11.6 µm (determined with the Helos instrument as in example 1) were processed with PP in accordance with example 1.

The results obtained were in accordance with those described in example 1.

Inventive Example 3

Spherical aluminum particles (ECKART) having a $D_{50}$ value of 2.27 µm, a $D_{90}$ value of 3.83 µm, and a $D_{99}$ value of 5.28 µm (determined with the Helos instrument as in example 1) were processed with PP in accordance with example 1.

The results obtained were in accordance with those described in example 1.

Inventive Example 4

Spherical aluminum particles (ECKART) having a $D_{50}$ value of 17.5 µm, a $D_{90}$ value of 34.5 µm, and a $D_{99}$ value of 62.0 µm (determined with the Helos instrument as in example 1) were processed with PP in accordance with example 1.

At levels of addition above 0.005% by weight of spherical aluminum particles in PP, it was possible to obtain high-contrast, dark and abrasion-resistant marks which exhibited very good edge definition and dot precision. The PP plates in this case remained transparent and color-neutral. At quantities in a range of 0.1-1.0% by weight of spherical aluminum particles, increasingly a grayish coloration was found, which accompanied a loss of transparency. PP plates with a spherical aluminum particle content of more than 1.0% by weight were gray-opaque.

The formation of glittering shards was observed here only in low proportions. It was not possible to observe any flow lines or streaks in the PP plates which contained the spherical aluminum particles.

Inventive Example 5

Spherical aluminum particles (ECKART) having a $D_{50}$ value of 39.3 µm, a $D_{90}$ value of 69.1 µm, and a $D_{99}$ value of 104 µm (determined with the Helos instrument as in example 1) were processed with PP in accordance with example 1.

At quantities in a range of 0.005-0.1% by weight of spherical aluminum particles in PP, it was possible to obtain high-contrast, dark and abrasion-resistant marks which exhibited good edge definition and dot precision. The PP plates in this case remained transparent and color-neutral. At quantities in a range of 0.1-1.0% by weight of spherical aluminum particles, increasingly a grayish coloration was found, which accompanied a loss of transparency. PP plates with a spherical aluminum particle content of more than 1.0% by weight were gray-opaque.

Over the entire concentration range, it was possible to observe in part particles and the formation of glittering shards.

It was not possible to observe any flow lines or streaks in the PP plates which contained the spherical aluminum particles.

Comparative Example 6

Spherical aluminum particles (ECKART) having a $D_{50}$ value of 140 µm and a $D_{90}$ value of 230 µm ($D_{99}$ value: not determinable) (determined with the Helos instrument as in example 1) were processed with PP in accordance with example 1.

At quantities above a region of 0.05% by weight of spherical aluminum particles in PP, it was possible to obtain high-contrast, dark and abrasion-resistant marks which exhibited very low edge definition and dot precision and were therefore inadequate. The PP plates in this case remained transparent and color-neutral. At quantities in a range of 0.2-2.0% by weight of spherical aluminum particles, increasingly a grayish coloration was found, which accompanied a loss of transparency. PP plates with a spherical aluminum particle content of more than 2.0% by weight were gray-opaque. Over the entire concentration range, significant fractions of coarse particles and a significant formation of glittering shards were observed.

It was not possible to observe any flow lines or streaks in the PP plates which contained the spherical aluminum particles.

Comparative Example 7

Fine, platelet-shaped aluminum effect pigments (PC 200, Eckart GmbH & Co KG, Fürth, Germany) having a $D_{10}$ value of 1.51 µm, $D_{50}$ value of 4.02 µm, and a $D_{90}$ value of 10.0 µm (determined with the Helos instrument as in example 1) were processed with PP in accordance with example 1.

In the case of spherical aluminum particles of ≧0.005% by weight, markings were obtainable. In this case the PP plates had a gray clouding even at this level of aluminum effect pigments. In the case of an amount of 0.01% by weight of aluminum effect pigments, the gray clouding was comparable with the gray clouding obtained in example 1 for a level of spherical aluminum particles ≧0.1% by weight. The plates were gray-opaque even for a pigment content of 0.02% by weight of aluminum effect pigments.

The markings were high-contrast, dark and abrasion-resistant, but exhibited reduced dot precision as compared with example 1. Typical flow lines and streaks that occur in the plastics material products obtained as a result of injection molding when platelet-shaped pigments are used were observable.

Comparative Example 8

Antimony-doped tin oxide particles (Mark-it™ pigments, Engelhard Corporation, USA) were processed with PP in accordance with example 1.

The resulting PP plates exhibited properties comparable with those of the PP plates produced in examples 1 and 2, but with slightly reduced dot precision. Instead of the gray coloration obtained in examples 1, 2, and 3, the coloration here, at a pigment content of ≧0.1% by weight, was brownish. It was not possible to observe the formation of flow lines or streaks. The Mark-it™ pigments used, however, contain highly toxic antimony.

Comparative Example 9

Mica flakes with antimony-doped tin oxide coating (Lazerflair® 825, E. Merck KGaA, Germany) were processed with PP in accordance with example 1.

The PP plates showed properties comparable with those of the PP plates obtained in example 1 and 2. Here, however, the dot precisions observed over all concentration ranges, although good, were reduced by comparison with those of examples 1, 2, 3 and 8; a first clouding occurred at concentrations of ≧0.1% by weight, and the medium became opaque at concentrations of ≧2.0% by weight.

Instead of a gray coloration obtained in examples 1 and 2 with an aluminum particle content of ≧0.1% by weight, in the case of the Lazerflair® 825 pigments a greenish coloration occurred in an analogous way. In the injection-molded plates, the flow lines and streaks typical in the injection molding of platelet-shaped effect pigment-containing plastics materials are observable. The Lazerflair® 825 pigment likewise contains toxic antimony.

Inventive Example 10

A powder of spherical aluminum particles (ECKART) having a $D_{50}$ value of 1.57 µm, a $D_{90}$ value of 3.37 µm, and a $D_{99}$ value of 7.55 µm (determined with the Helos instrument as in example 1) was processed in a mixture with thermoplastic polystyrene (PS) (Styron 678-E, DOW, USA) by means of injection molding to form plates (area 42×60 mm, thickness 2 mm) in accordance with example 1.

PS plates without spherical aluminum particles in them were difficult to mark. When spherical aluminum particles were used, markings were obtained by laser at a level of 0.005% by weight of spherical aluminum particles. At a level at or above 0.02% by weight of spherical aluminum particles, it was possible to obtain high-contrast, dark and abrasion-resistant marks which exhibited satisfactory edge definition and dot precision. The PS plates in this case remained transparent and color-neutral. At quantities in a range of 0.05-0.5% by weight of spherical aluminum particles, increasingly a grayish coloration of the PS plates was found, which accompanied a loss in transparency. PS plates with an amount of 0.5% by weight or more of spherical aluminum particles were gray-opaque. No flow lines or streaks were observed.

Inventive Example 11

A powder of spherical aluminum particles (ECKART) having a $D_{50}$ value of 1.57 µm, a $D_{90}$ value of 3.37 µm, and a $D_{99}$ value of 7.55 µm (determined with the Helos instrument as in example 1) was processed in a mixture with thermoplastic polycarbonate (PC) (Calibre 201 TNT, DOW, USA) by means of injection molding to form plates (area 42×60 mm, thickness 2 mm) in accordance with example 1.

PC plates without spherical aluminum particles in them were difficult to mark. At quantities of 0.005% by weight and above of spherical aluminum particles, high-contrast, dark and abrasion-resistant marks were obtained. The results in the other quantity ranges corresponded to those obtained in example 1.

Inventive Example 12

A powder of spherical aluminum particles (ECKART) having a $D_{50}$ value of 1.57 µm, a $D_{90}$ value of 3.37 µm, and a $D_{99}$ value of 7.55 µm (determined with the Helos instrument as in example 1) was processed in a mixture with thermoplastic polyethylene terephthalate (PET) (Suka 5141, Du Pont, USA) by means of injection molding to form plates (area 42×60 mm, thickness 2 mm) in accordance with example 1.

PET plates without spherical aluminum particles in them were difficult to mark. At amounts of 0.005% by weight of spherical aluminum particles, the PET plates were markable. At amounts of 0.005% by weight and above, high-contrast, dark and abrasion-resistant marks were obtained. The results in the further quantity ranges corresponded to those obtained in example 1, with good, albeit reduced, dot precisions.

Inventive Example 13

A powder of spherical aluminum particles (ECKART) having a $D_{50}$ value of 1.57 μm, a $D_{90}$ value of 3.37 μm, and a $D_{99}$ value of 7.55 μm (determined with the Helos instrument as in example 1) was processed in a mixture with thermoplastic styrene-acrylonitrile (SAN) (Tyril 867 E, DOW, USA) by means of injection molding to form plates (area 42×60 mm, thickness 2 mm) in accordance with example 1.

SAN plates without spherical aluminum particles in them were difficult to mark. At a level of 0.01% by weight of spherical aluminum particles, the SAN plates were markable. At a level of 0.02% by weight or more of spherical aluminum particles, high-contrast, dark and abrasion-resistant marks were obtained. The results in the further quantity ranges corresponded to those obtained in example 1, with good, albeit slightly reduced, dot precisions.

Inventive Example 14

A powder of spherical aluminum particles (ECKART) having a $D_{50}$ value of 1.57 μm, a $D_{90}$ value of 3.37 μm, and a $D_{99}$ value of 7.55 μm (determined with the Helos instrument as in example 1) was processed in a mixture with thermoplastic acrylic-butadiene-styrene copolymer (ABS) (Magnum 8433, DOW, USA) by injection molding in the same way as in example 1 to form plates (area 42×60 mm, thickness 2 mm).

ABS plates without spherical aluminum particles in them were difficult to mark. At a level of 0.005% by weight of spherical aluminum particles, high-contrast, dark and abrasion-resistant marks in light-colored ABS were obtained which exhibited excellent edge definition and dot precision. The plates in this case remained color-neutral, since ABS as a material is itself not transparent.

At a level of spherical aluminum particles in a range of 0.05-0.1% by weight, increasingly a grayish coloration was observed. The ABS plates with a level of 0.2% by weight of spherical aluminum particles were gray. No flow lines or streaks were observed.

Inventive Example 15

A powder of spherical aluminum particles (ECKART) having a $D_{50}$ value of 1.57 μm, a $D_{90}$ value of 3.37 μm, and a $D_{99}$ value of 7.55 μm (determined with the Helos instrument as in example 1) was processed in a mixture with low-density polyethylene (LDPE) (LDPE 410-E, DOW, USA) to give blown films having a thickness of 100 μm, using a scientific film extruder (LabTech, Thailand).

A concentration series was prepared with addition of 2.0%, 1.0%, 0.5%, 0.2%, 0.1%, 0.05%, and 0.02% by weight.

The LDPE films without spherical aluminum particles in them were not markable. In a range of 0.02-0.5% by weight of spherical aluminum particles, laser treatment produced high-contrast, dark and abrasion-resistant marks on transparent films of pure color. Excellent dot precision and distinctness of image were observed. At a level of ≧0.5% by weight of spherical aluminum particles, an increasing gray coloration of the films was observed.

Inventive Example 16

A powder of spherical aluminum particles (ECKART) having a $D_{50}$ value of 1.57 μm, a $D_{90}$ value of 3.37 μm, and a $D_{99}$ value of 7.55 μm (determined with the Helos instrument as in example 1) was processed in a mixture with thermoplastic polyamide PA6 (Gerstamid R 200 S, Resin Express, Germany) by injection molding in the same way as in example 1 to form plates (area 42×60 mm, thickness 2 mm).

PA6 plates without spherical aluminum particles in them were not markable. The results in the further quantity ranges corresponded to those obtained in example 14.

In the table which follows, the examples and their results are compiled once again.

TABLE 1

Compilation of the results of the examples

| Example | Additive | Polymer | Markability of the polymer without addition | Concentrations for high-contrast marking [% by wt.] | Concentrations at which clouding occurs [% by wt.] | Concentrations at which coloration occurs [% by wt.] | Concentrations with loss of transparency (opaque medium) [% by wt.] | Dot precision | Appearance of visible particles (e.g., coarse particles or shards) |
|---|---|---|---|---|---|---|---|---|---|
| 1 | Al powder (spherical) | PP | Not markable | ≧0.005 | ≧0.05 | ≧0.1 (grayish) | ≧0.5 | excellent | no |
| 2 | Al powder (spherical) | PP | Not markable | ≧0.005 | ≧0.05 | ≧0.1 (grayish) | ≧0.5 | excellent | no |
| 3 | Al powder (spherical) | PP | Not markable | ≧0.005 | ≧0.05 | ≧0.1 (grayish) | ≧0.5 | excellent | no |
| 4 | Al powder (spherical) | PP | Not markable | ≧0.005 | ≧0.1 | ≧0.2 (grayish) | ≧1.0 | very good | minimal |
| 5 | Al powder (spherical) | PP | Not markable | ≧0.005 | ≧0.1 | ≧0.2 (grayish) | ≧1.0 | good | yes |
| 6 (comp.) | Al powder (spherical) | PP | Not markable | ≧0.05 | ≧0.2 | ≧0.5 (grayish) | ≧2.0 | inadequate | significant |
| 7 (comp.) | Al pigment (platelet-shaped) | PP | Not markable | ≧0.005 | ≧0.005 | ≧0.01 (grayish) | ≧0.02 | good | no |
| 8 (comp.) | Mark-it ™ (antimony-doped tin oxide particles) | PP | Not markable | ≧0.005 | ≧0.05 | ≧0.1 (brownish) | ≧0.5 | excellent | no |

TABLE 1-continued

Compilation of the results of the examples

| Example | Additive | Polymer | Markability of the polymer without addition | Concentrations for high-contrast marking [% by wt.] | Concentrations at which clouding occurs [% by wt.] | Concentrations at which coloration occurs [% by wt.] | Concentrations with loss of transparency (opaque medium) [% by wt.] | Dot precision | Appearance of visible particles (e.g., coarse particles or shards) |
|---|---|---|---|---|---|---|---|---|---|
| 9 (comp.) | Lazerflair ® 825 (mica flakes with antimony-doped tin oxide coating) | PP | Not markable | ≧0.005 | ≧0.1 | ≧0.1 (greenish) | ≧2.0 | good | no |
| 10 | Al powder (spherical) | PS | Difficult to mark | ≧0.02 | ≧0.05 | ≧0.1 (grayish) | ≧0.5 | satisfactory | no |
| 11 | Al powder (spherical) | PC | Difficult to mark | ≧0.005 | ≧0.05 | ≧0.1 (grayish) | ≧0.5 | excellent | no |
| 12 | Al powder (spherical) | PET | Difficult to mark | ≧0.005 | ≧0.05 | ≧0.1 (grayish) | ≧0.5 | good | no |
| 13 | Al powder (spherical) | SAN | Difficult to mark | ≧0.02 | ≧0.05 | ≧0.1 (grayish) | ≧0.5 | good | no |
| 14 | Al powder (spherical) | ABS | Difficult to mark | ≧0.005 | ≧0.05 | ≧0.1 (grayish) | ABS is not transparent | excellent | no |
| 15 | Al powder (spherical) | LDPE | Not markable | ≧0.02 | ≧0.05 | ≧0.05 (grayish) | ≧0.05 | very good | no |
| 16 | Al powder (spherical) | PA6 | Not markable | ≧0.005 | ≧0.05 | ≧0.1 (grayish) | PA 6 is not transparent | excellent | no |

As is evident from the summarizing table 1, the present invention allows the provision of laser-markable plastics which can be marked with a laser transparently and at the same time with very high contrast and high distinctness of image.

A very high-contrast mark is generally obtainable at a level of spherical aluminum particles of 0.005% by weight or above, based on the total weight of the plastics composition. Gray coloration or clouding occurs in general above a level of spherical aluminum particles of 0.05% by weight.

From comparative example 7 it is evident that, when using aluminum effect pigments of comparable particle size, clouding or gray coloration occurs when the plastic is also laser-markable. The limit value here is in each case at 0.005% by weight.

From the comparison with comparative examples 5 and 6 it is evident that the present invention allows the provision of laser-markable plastics without the use of highly toxic antimony-containing compounds or particles.

From the subsequent comparative examples 17 and 18 and also from inventive example 19 it is apparent that, using pearlescent pigments as laser marking agents, flow lines become visible or appear.

Comparative Example 17

Along the Lines of EP 1 145 864 A1

In the same way as in example 1, a silver pearlescent pigment (PX1001, ECKART) was processed in polypropylene (PP) in a concentration of 0.49% by weight. In this case it was possible to obtain high-contrast, dark and abrasion-resistant marks which exhibited satisfactory to adequate edge definition and dot precision. However, in this case the PP plates had a pearly light-luster and were opaque. The formation of flow lines in the PP plates was very distinctly observable.

Comparative Example 18

Along the Lines of EP 1 145 864 A1

In the same way as in example 1, a silver pearlescent pigment (PX1001, ECKART) was processed in polypropylene (PP), in a concentration of 0.49% by weight, along with zinc powder which had a particle size distribution as follows: $D_{10}$=1.9 µm; $D_{50}$=3.4 µm; $D_{90}$=6 µm (zinc dust 17640, manufacturer: Norzinko GmbH, Gosslar, Germany) in 0.0098% by weight with PP.

The results corresponded exactly to those given under comparative example 8.

Example 19

In the same way as in example 1, zinc powder (zinc dust 17640, Norzinko GmbH, Gosslar, Germany) was processed with polypropylene (PP).

When the zinc powder was used at an amount above 0.005% relative to PP, it was possible to obtain high-contrast, dark and abrasion-resistant marks which exhibited satisfactory edge definition and dot precision. At levels added of 0.05% by weight of more, very good dot precisions and edge definitions were obtained. The PP plates remained transparent and color-neutral.

At a level of zinc powder of 0.05% by weight and above, a grayish coloration was increasingly observed, which went hand in hand with a loss of transparency. PP plates with a zinc powder content of more than 1.0% by weight were gray-opaque. However, good markings were achievable only at relatively low write speeds of the Nd:YAG laser (50 mm/s, 8 W, pulse frequency: 5 KHz) with very good dot precision and high contrast.

It was not possible to observe any flow lines or streaks in the PP plates which contained the spherical aluminum particles.

Example 20

In the same way as in example 1, a silver pearlescent pigment (PX1001, ECKART) was processed in a concentration of 0.05% by weight, along with zinc powder (zinc dust 17640 Norzinko GmbH, Gosslar, Germany) in a concentration of 0.25% by weight and 0.05% by weight, with PP.

The results were comparable with those set out in example 19, but in this case somewhat reduced dot precisions were observed. The plates remained transparent in the stated concentrations, but the formation of flow lines was already observable.

The results of examples 19 and 20, relative to those of comparative examples 17 and 18, show clearly the advantages associated with use of metal particles without or with only small amounts of pearlescent pigments. No advantage may be drawn from the results of the two comparative examples 17 and 18 for the use of zinc powder.

A comparison of the two examples 19 and 20 shows that flow lines may occur even with small amounts of pearlescent pigments.

Examples 21 to 24 below highlight the particular suitability of metal particles as a laser weldability agent.

Example 21

A powder of spherical aluminum particles having a $D_{50}$ value of 1.57 µm, a $D_{90}$ value of 3.37 µm and a $D_{99}$ value of 7.55 µm (determined with the Helos instrument as in example 1) were processed in a 0.05% by weight mixture with thermoplastic polypropylene (R 771-10; DOW, USA) to plates in an injection molding process (in analogy to example 1, area 42×60 mm, thickness 1 mm).

A plate thus obtained was covered with a correspondingly unpigmented plate made of thermoplastic polypropylene (R 771-10; DOW, USA) and a 10×10 mm area was irradiated using an Nd:YAG laser (1064 nm; 8 W, pulse frequency 5 KHz; write speed 50 mm/s). As a result it was possible to induce melting of the plates at their area of contact in the irradiated region. The weld could be separated again only by employing force.

Comparative Example 22

In the same way as in example 20, the procedure was carried out with two unpigmented plates made from thermoplastic polypropylene (R 771-10; DOW, USA). As a result of this, it was not possible to induce melting of the plastics plates.

Example 23

A powder of spherical aluminum particles having a $D_{50}$ value of 1.57 µm, a $D_{90}$ value of 3.37 µm, and a $D_{99}$ value of 7.55 µm (determined with the Helos instrument as in example 1) was processed in a 0.5% by weight mixture with low-density polyethylene (LDPE) (LDPE 410-E, DOW, USA) to blown films having a thickness of 100 µm by means of a film extruder (type: Scientific, LabTech, Thailand). A film section (110×70 mm) was covered with a correspondingly unpigmented LDPE film and treated in the same way as in example 20. As a result of this it was possible to induce melting of the films at their contact area in the irradiated region. The weld could be separated again only with application of force and with destruction of the films at the site of melt fusion.

Comparative Example 24

The procedure of example 22 was repeated with two unpigmented films of low-density polyethylene (LDPE) (LDPE 410-E, DOW, USA). As a result of this, it was not possible to induce melt fusion of the polymeric films.

What is claimed is:

1. A method for producing a laser markable and/or laser weldable plastic comprising incorporating into said plastic at least one of a laser marking and a laser welding agent comprising spherical metal particles, which are free of antimony and/or antimony-containing compounds, wherein the particle size distribution of the spherical metal particles in said plastic, as determined by laser granulometry, in the form of the volume-averaged cumulative undersize particle size distribution, has a $D_{99}$ value of <110 µm, a $D_{90}$ value of <75 µm, and a $D_{50}$ <45 µm.

2. The method as claimed in claim 1, wherein the cumulative undersize particle size distribution of the spherical metal particles in said plastic has a $D_{99}$ value of <70 µm and a $D_{90}$ value of <40 µm.

3. The method of claim 1, wherein the cumulative undersize particle size distribution of the spherical metal particles in said plastic has a $D_{99}$ value of <65 µm and a $D_{90}$ value of <36 µm.

4. The method of claim 1, wherein the metal particles comprise metals selected from the group consisting of aluminum, copper, silver, gold, zinc, tin, iron, titanium, vanadium, magnesium, and alloys thereof.

5. The method of claim 1, wherein the metal particles have a metal oxide content of not more than 10% by weight, based on the total weight of the metal particles.

6. The method of claim 1, wherein the metal particles are provided with at least one inorganic metal oxide layer.

7. The method of claim 6, wherein the metal oxide layer comprises $SiO_2$.

8. A masterbatch wherein the masterbatch comprises the spherical metal particles according to claim 1 and at least one dispersion carrier.

9. The masterbatch as claimed in claim 8, wherein the dispersion carrier is selected from the group consisting of plastics components, waxes, resins, additives and mixtures thereof.

10. The masterbatch as claimed in claim 8, wherein the amount of said spherical metal particles in the masterbatch is 80% to 99% by weight, based on the total weight of the masterbatch.

11. The masterbatch as claimed in claim 8, wherein the amount of spherical metal particles in the masterbatch is 0.001% to 5% by weight, based on the total weight of the masterbatch.

12. A method for producing a laser-markable and/or laser-weldable plastic which comprises combining a plastic with the masterbatch according to claim 8.

13. A laser-markable and/or laser-weldable plastic, wherein the plastic comprises a laser marking and/or laser welding agent as claimed in claim 1, or a masterbatch as claimed in claim 8.

14. The laser-markable and/or laser-weldable plastic as claimed in claim 13, wherein the fraction of the metal particles in the plastic is 0.0005% to 0.8% by weight, based on the total weight of the plastic.

15. The laser-markable and/or laser-weldable plastic as claimed in claim 13, wherein the fraction of the metal particles in the plastic is 0.005% to 0.5% by weight, based on the total weight of the plastic.

16. The laser-markable and/or laser-weldable plastic as claimed in claim 13, wherein the plastic is a plastic film or a label.

17. The laser-markable and/or laser-weldable plastic as claimed in claim 16, wherein the plastic is a plastic film having a fraction of the metal particles of 0.01% to 1.0% by weight, based on the total weight of the plastic film.

18. The laser-markable and/or laser-weldable plastic as claimed in claim 13, wherein the plastic is a three-dimensional plastic body.

19. The laser-markable and/or laser-weldable plastic as claimed in claim 13, wherein the laser-markable and/or laser-weldable plastic is a constituent of an article which itself is not laser-markable.

20. The laser-markable plastic as claimed in claim 13, wherein the plastic comprises a thermoplastic, thermoset, elastomer or rubber.

21. The laser-weldable plastic as claimed in claim 20, wherein the plastic comprises a thermoplastic.

22. The laser-markable and/or laser-weldable plastic as claimed in claim 14, wherein the fraction of the metal particles in the plastic is 0.001% to 0.5% by weight, based on the total weight of the plastic.

23. The laser-markable and/or laser-weldable plastic as claimed in claim 15, wherein the fraction of the metal particles in the plastic is 0.01% to 0.1% by weight, based on the total weight of the plastic.

24. The laser-markable and/or laser-weldable plastic as claimed in claim 17, wherein the fraction of the metal particles in the plastic film is 0.02% to 0.5% by weight, based on the total weight of the plastic film.

* * * * *